United States Patent
Marndi et al.

(10) Patent No.: US 8,997,084 B2
(45) Date of Patent: Mar. 31, 2015

(54) METHOD AND APPARATUS FOR DETERMINING COMPATIBLE VERSIONS OF DEPENDENT ENTITIES IN A COMPUTER SYSTEM

(75) Inventors: Raj Narayan Marndi, Bangalore Karnataka (IN); Ravi Kumar Gullapalli, Bangalore Karnataka (IN); Sathyamurthy Dattahreya Hassan, Bangalore Karnataka (IN); Joby Chacko Poriyath, Bangalore Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 876 days.

(21) Appl. No.: 13/090,270

(22) Filed: Apr. 20, 2011

(65) Prior Publication Data

US 2012/0272228 A1 Oct. 25, 2012

(51) Int. Cl.
*G06F 9/44* (2006.01)
*G06F 9/445* (2006.01)

(52) U.S. Cl.
CPC .............. *G06F 8/65* (2013.01); *G06F 9/44536* (2013.01)
USPC ............................ 717/170; 717/168; 717/174

(58) Field of Classification Search
None
See application file for complete search history.

(56) References Cited

U.S. PATENT DOCUMENTS

| | | | | |
|---|---|---|---|---|
| 5,459,871 | A * | 10/1995 | Van Den Berg | 718/104 |
| 5,617,510 | A * | 4/1997 | Keyrouz et al. | 706/45 |
| 5,862,386 | A * | 1/1999 | Joseph et al. | 717/170 |
| 6,026,413 | A * | 2/2000 | Challenger et al. | 717/108 |
| 6,519,767 | B1 * | 2/2003 | Carter et al. | 717/140 |
| 7,409,679 | B2 * | 8/2008 | Chedgey et al. | 717/144 |
| 7,865,888 | B1 * | 1/2011 | Qureshi et al. | 717/168 |
| 8,359,592 | B2 * | 1/2013 | Duplessis et al. | 717/174 |
| 8,438,558 | B1 * | 5/2013 | Adams | 717/170 |
| 2005/0049906 | A1 * | 3/2005 | Leymann et al. | 705/8 |
| 2005/0132350 | A1 * | 6/2005 | Markley et al. | 717/168 |
| 2007/0169103 | A1 * | 7/2007 | Bhatkhande et al. | 717/170 |
| 2008/0301668 | A1 | 12/2008 | Zachmann | |
| 2008/0320460 | A1 | 12/2008 | Miller et al. | |
| 2009/0204458 | A1 | 8/2009 | Wiese et al. | |
| 2010/0070948 | A1 * | 3/2010 | Rama et al. | 717/105 |
| 2010/0088663 | A1 * | 4/2010 | Hammer et al. | 717/101 |
| 2010/0146497 | A1 | 6/2010 | Kogan et al. | |
| 2011/0191762 | A1 * | 8/2011 | Ananthanarayanan et al. | 717/170 |
| 2011/0209133 | A1 * | 8/2011 | Mahajan et al. | 717/170 |
| 2011/0219368 | A1 * | 9/2011 | Festi | 717/174 |
| 2012/0072887 | A1 * | 3/2012 | Basak | 717/123 |
| 2012/0079454 | A1 * | 3/2012 | Kwan et al. | 717/120 |
| 2012/0079502 | A1 * | 3/2012 | Kwan et al. | 718/106 |

OTHER PUBLICATIONS

Sangal et al., "Using Dependency Models to Manage Complex Software Architecture," OOPSLA'05, Oct. 16-20, 2005, San Diego, California, USA, pp. 1-10.*

(Continued)

*Primary Examiner* — Thuy Dao
*Assistant Examiner* — Stephen Berman
(74) *Attorney, Agent, or Firm* — Hewlett-Packard Patent Department

(57) ABSTRACT

A computer executed method of determining compatible versions of dependent entities of a root entity having a specified version in a computer system. The method comprises building a directed graph containing dependent entities and dividing the directed graph into multiple levels. Compatible versions are determined for entities in upper levels of the directed graph before determining compatible versions for entities in lower levels of the directed graph.

15 Claims, 12 Drawing Sheets

(56) References Cited

OTHER PUBLICATIONS

UC Denver, "Graph and Digraph Glossary," downloaded from the Wayback Machine Internet Archive on Jul. 1, 2014, <url>: http://web.archive.org/web/20100704023057/http://www-math.ucdenver.edu/~wcherowi/courses/m4408/glossary.html, pp. 1-10.*

Wikipedia, "Breadth-first search," downloaded from the Wayback Machine Internet Archive on Jul. 1, 2014, <url>: http://web.archive.org/web/20110406101156/http://en.wikipedia.org/wiki/Breadth-first_search, pp. 1-6.*

Collberg et al., "A System for Graph-Based Visualization of the Evolution of Software," 2003, ACM Symposium on Software Visualization, pp. 77-86.*

Conradi et al., "Version Models for Software Configuration Management," 1998, ACM Computing Surveys, vol. 30, No. 2, pp. 232-282.*

Jenson et al., "An Empirical Study of the Component Dependency Resolution Search Space," 2010, L. Grunske, R. Reussner, and F. PlasH (Eds.): CBSE 2010, LNCS 6092, pp. 182-199.*

S M Thompson., "Configuration management-keeping it all together," BT Technol Journal, vol. 15, No. 3, pp. 48-60.

Karin Becker et al., "Automatically Determining Compatibility of Evolving Services," Proceedings of the 2008 IEEE International Conference on Web Services, IEEE Computer Society Washington, DC, USA, 2008, pp. 161-168.

David Frank et al., "Using an Interface Proxy to Host Versioned Web Services," Proceedings of the 2008 IEEE International Conference on Services Computing—vol. 2, IEEE Computer Society Washington, DC, USA, 2008, pp. 325-332.

Perry, Dewayne E., "Version Control in the Inscape Environment", AT&T Bell Laboratories, Murray Hill, NJ 07974, ACM 1987, pp. 142-149.

Gunter, Carl A., "Abstracting Dependencies between Software Configuration Items", University of Pennsylvania, SIGSOFT'96, California, USA, 1996 ACM, pp. 167-178.

Zhang, Jie, et al., "The Optimal Software Licensing Policy under Quality Uncertainty", University of Rochester, Rochester, NY 14627, ICEC 2003, Pittsburgh, PA, ACM 1-58113-788-5/03/09, pp. 276-286.

Yoon, Ii-Chul, et al., "Effective and Scalable Software Compatibility Testing", Dept. of Computer Science, University of Maryland, College Park, MD 20742, ISSTA '08, Jul. 20-24, 2008, Seattle, Washington, USA, pp. 63-73.

Geneves, Pierre, et al. "Identifying Query Incompatibilities with Evolving XML Schemes", ICFP'09, Aug. 31-Sep. 2, 2009, Edinburgh, Scotland, UK, pp. 221-230.

Brown, David J. and Runge, Karl, "Library Interface Versioning in Solaris and Linux", Proceedings of the 4th Annual Linux Showcase & Conference, USENIX Association, Atlanta, Georgia, Oct. 10-14, 2000, pp. 153-162.

* cited by examiner

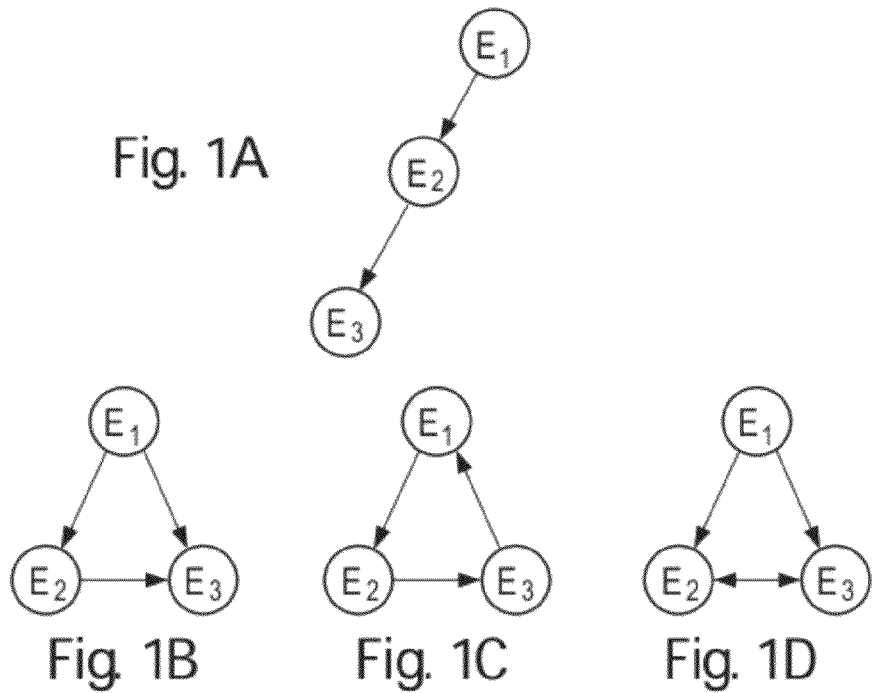
Fig. 1A
Fig. 1B   Fig. 1C   Fig. 1D
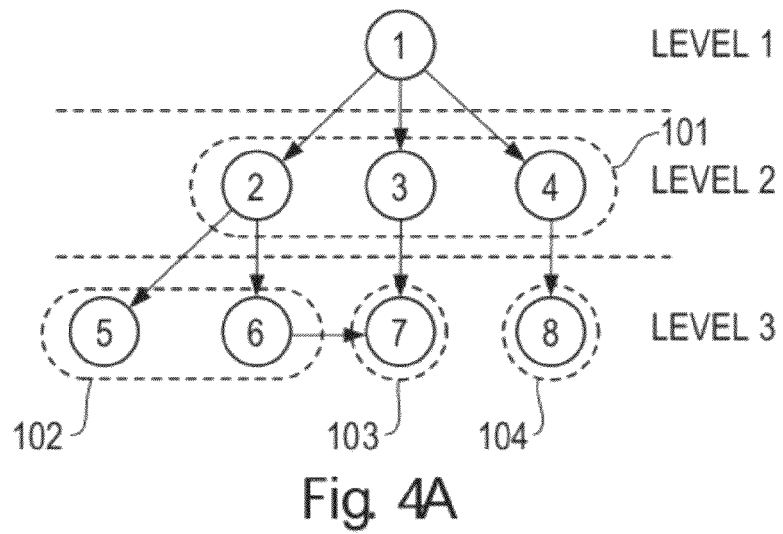
Fig. 4A
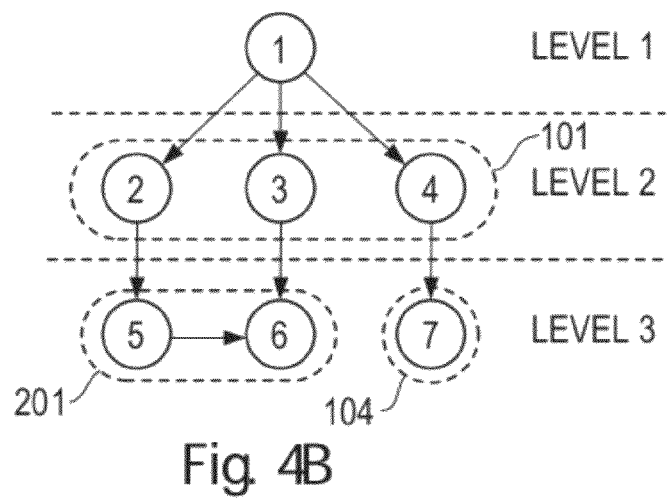
Fig. 4B

METHOD AND APPARATUS FOR DETERMINING COMPATIBLE VERSIONS OF DEPENDENT ENTITIES IN A COMPUTER SYSTEM

BACKGROUND OF THE INVENTION

Modern computer systems may comprise many interacting entities such as software components, hardware components, files or services for instance. The entities may work together such that an operation of a second entity may depend upon a first entity. Any or all such entities may be modified or replaced from time to time. When an entity is updated to a new version, a check may be made to make sure that the other entities in the system are compatible with the new version of the first entity and it may be determined what changes to other entities would be needed to ensure the system continues to function. The complexity of resolving the version compatibility of the components in large computer systems has become a major challenge for computer system administrators and tools have been developed to assist them.

BRIEF DESCRIPTION OF THE DRAWINGS

Examples will now be described, by way of non-limiting example only, with reference to the accompanying drawings, in which:

FIG. 1A is a directed graph representing three entities and their dependency relationships in one example;

FIG. 1B is directed graph representing three entities and their dependency relationships in another example;

FIG. 1C is a directed graph representing three entities in a cyclic dependency relationship in one example;

FIG. 1D is a directed graph representing three entities in a triangular dependency relationship in one example;

FIG. 4A shows an example of a directed graph of the dependency relationships between seven entities and dividing the directed graph into levels and groups within the levels;

FIG. 4B shows the example of FIG. 4A after two of the groups have been merged;

DETAILED DESCRIPTION

Figure 2:
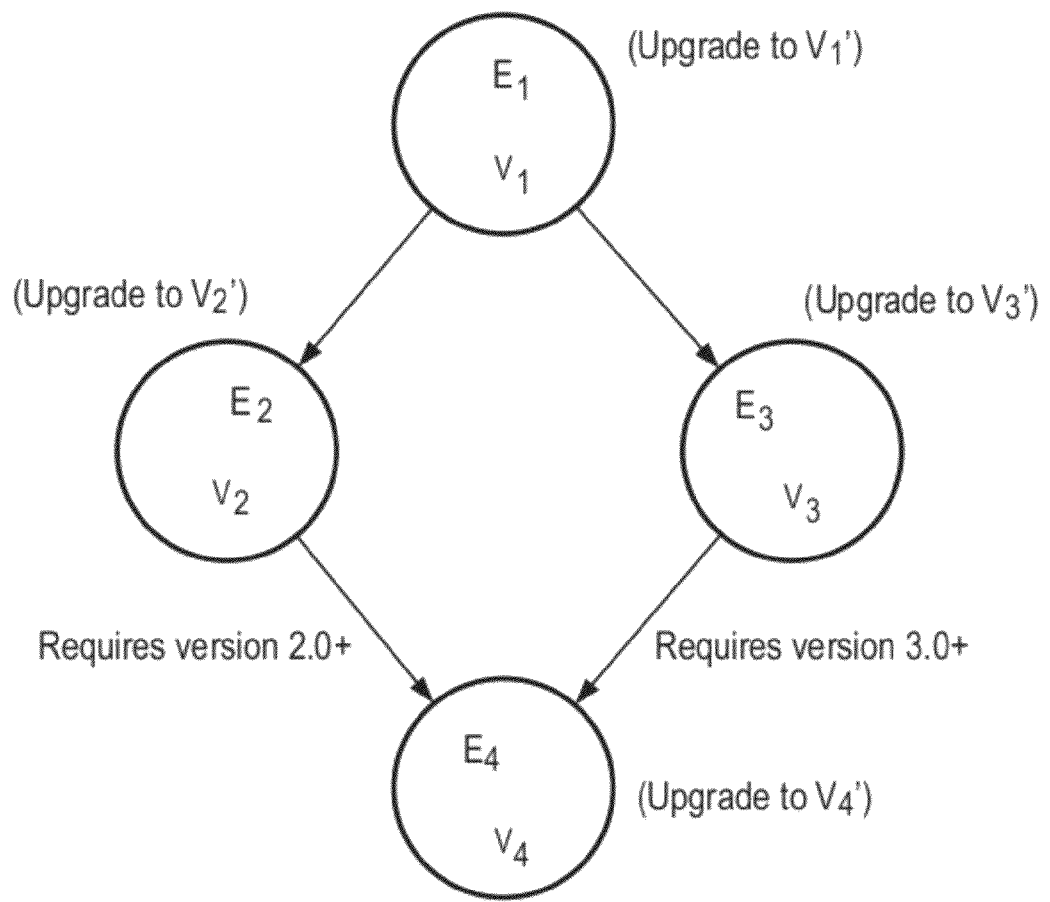
FIG. 2 shows an example of a root entity, two entities which are directly dependent on the root entity and an entity which is indirectly dependent on the root entity.

A computer system may have a plurality of entities, such as software or hardware components, files or services, which depend on each other. The computer system may comprise a single computer or a plurality of computers connected by a network. The computer system may also comprise peripheral devices which are connected to a computer either directly or via a network. The computer system may, for instance, be a cloud computing network providing services to end users.

When a system having a plurality of interacting entities is installed for the first time, it is necessary to provide compatible versions of each entity if the system is to run optimally. Likewise, when a first entity in a computer system is changed to a new version, other entities in the computer system may need to have their versions changed as well to make sure that the entities are compatible with each other. In large systems this is a complicated process as many entities may depend upon each other. Changing the version of an entity means upgrading the entity from a lower version to a higher version, or downgrading an entity from a higher version to a lower version, or changing to a different version of the entity which is neither higher nor lower (e.g. an alternative version having a different feature set). For conciseness the rest of this specification will refer to upgrading an entity, but it is to be understood that the same processes for determining compatible versions can be applied when an entity is downgraded or changed to any different version or when an entity is installed for the first time. More specific examples of systems which have a large number of interacting entities include Unix products, computer programming language compilers such as C, C++, Java etc, database products and middleware. Upgrading of entities in a system may be carried out by an update tool which may for instance, in one example, reside on a client and request the necessary updates from a server.

A first entity is directly dependent on another entity if it interacts with the another entity and requires a certain version (or range of versions) of the other entity in order to operate smoothly. In FIG. 1A the entities are shown by circles and the dependency relationships by arrows between the circles. Entity $E_2$ is directly dependent on entity $E_1$. Entity $E_3$ is directly dependent on $E_2$ which is directly dependent on $E_1$, therefore $E_3$ is said to be indirectly dependent on $E_1$. The root entity in a group of entities is the entity on which all other entities depend directly or indirectly. In FIG. 1A, $E_1$ is the root entity. When the version of the root entity is changed, it triggers possible changes in versions of all its direct and indirect dependent entities. Thus, upgrading the root entity may lead to upgrading all other entities which are directly or indirectly dependent on it.

The dependency relationships between entities may be represented by a directed graph. A graph is an abstract representation of a set of entities where some of the entities are connected by links. A directed graph is a graph in which the links are directional. In graph theory, the entities are referred to as nodes and the links referred to as edges. FIG. 1A is in fact an example of a directed graph. The entities $E_1$, $E_2$ and $E_3$ are represented by nodes and the dependency relationships are represented by directed edges (the arrows connecting the nodes). In a dependency relation of two entities where a second entity is dependent on a first entity, the first entity is called a "parent entity" and second entity is called a "child entity". Thus in FIG. 1A, $E_1$ is the parent entity (or node) of $E_2$. Similarly, $E_2$ is the child entity (or node) of $E_1$. Likewise $E_3$ is the child entity (or node) of $E_2$. While $E_3$ is indirectly dependent on $E_1$, it is not said to be a child entity of $E_1$, because it does not depend directly on $E_1$.

Directed graphs showing further examples will now be described. In FIG. 1B, first entity $E_1$ is the root entity. Second entity $E_2$ is directly dependent on the first entity $E_1$. Third entity $E_3$ is directly dependent on both the first entity $E_1$ and the second entity $E_2$. Thus $E_3$ is a child entity of both $E_1$ and $E_2$.

FIG. 1C shows an example of a cyclic dependency relationship. Cyclic dependency is the situation where a parent entity has a child entity on which it is also indirectly dependent. In this example, second entity $E_2$ depends directly on first entity $E_1$, third entity $E_3$ depends directly on second entity $E_2$ and first entity $E_1$ depends directly on third entity $E_3$. Therefore $E_1$ is a parent of second entity $E_2$, but also indirectly dependent on $E_2$ because of its dependency on $E_3$. The dependency relationship can be written $E_1 \rightarrow E_2 \rightarrow E_3 \rightarrow E_1$. This 'cyclic dependency' leads to special considerations when determining the compatible versions of the entities, as will be described later.

FIG. 1D is an example of a triangular dependency relationship. A triangular dependency relationship is a relationship in which two child entities have a common parent and are mutually dependent on each other. In this example, second entity $E_2$ and third entity $E_3$ are both children of first entity $E_1$, but are also mutually dependent on each other. A pair of entities being interdependent or mutually dependent means that each entity requires a certain version (or range of versions) of the other entity in order that the two entities can interact smoothly. The requirement operates in both directions and so the edge linking the two entities is shown by a double headed arrow. Triangular dependency leads to special considerations when determining the compatible versions of the entities as will be described later.

FIG. 2 is a directed graph showing four entities $E_1$-$E_4$ having initial compatible versions as $V_1$-$V_4$ respectively. FIG. 2 also shows a set of consequential changes when the version of the root entity is upgraded. $E_1$ is the root entity. $E_2$ and $E_3$ are directly dependent on $E_1$. $E_4$ is directly dependent on $E_2$ and $E_3$. In this example $E_1$ is upgraded to a specified new version $V_1'$ from $V_1$. The second and third entities $E_2$ and $E_3$ are then upgraded to new versions $V_2'$ from $V_2$ and $V_3'$ from $V_3$ respectively, which are compatible with the new version $V_1'$ of the first entity $E_1$. A check is then made to find a version $V_4'$ of the fourth entity $E_4$, which is compatible with both the new version $V_2'$ of the second entity $E_2$ and the new version $V_3'$ of third entity $E_3$. As the fourth entity $E_4$ is directly dependent on both the second and third entities $E_2$ and $E_3$, the highest compatibility constraint will be chosen. For example, if $V_2'$ is compatible with versions 2.0 and higher of fourth entity $E_4$ and $V_3'$ is compatible with versions 3.0 and higher of $E_4$, then $E_4$ is updated to version 3.0 so that it is compatible with both $V_2'$ and $V_3'$.

Compatibility between two entities may sometimes be expressed in terms of a range having upper and lower limits. Thus there may be a choice of compatible versions within these limits. However, it may not always be the case that any version within the range can be chosen, because compatibility relationships with entities other than said two entities may also need to be considered. In order for the resulting system to function reliably each entity should be compatible with the other entities with which it has a dependency relationship.

FIG. 2 is a simple example containing only four entities. In many modern computer systems and cloud computing networks there are very large numbers of entities. For example, there may be one hundred entities or more and many dependency relationships between them. This makes determining compatible versions of the entities a complex issue.

Figure 3A:
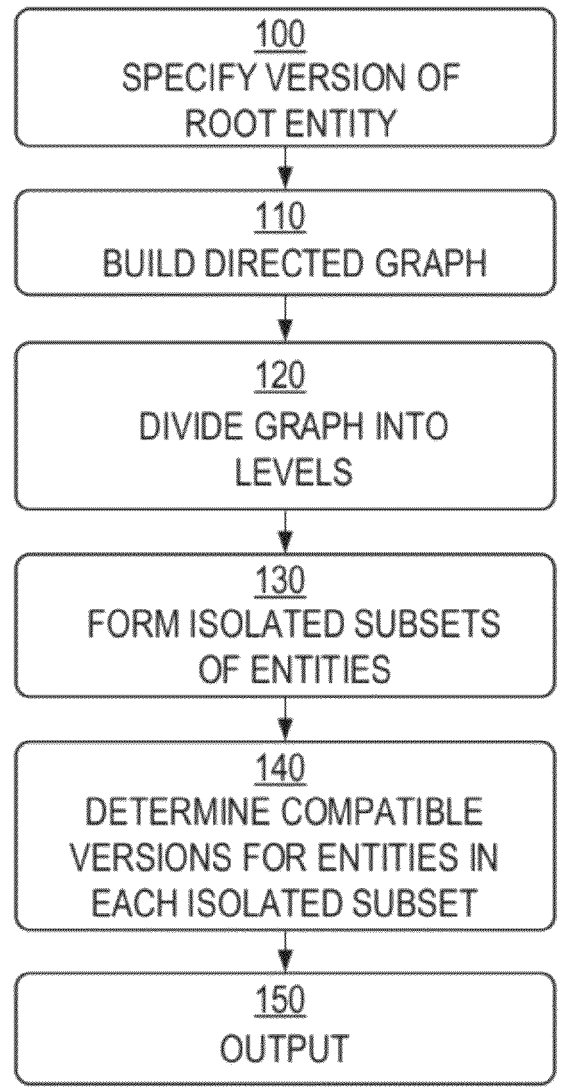
FIG. 3A is a flow diagram of an example method for determining compatible versions for dependent entities in a computer system.

FIG. 3A is a flow diagram showing an example method of determining compatible versions for entities in a computer system comprising a root entity and a set of other entities that are dependent on the root entity. At 100 a version is specified for the root entity. The specified version may, for example, be input by a user or system administrator, generated by a computer, received as an instruction over a network, or read from a storage medium. The specified version may for instance be a version specified for the first entity when the first entity is installed on the system for the first time, or it may be a specified change to the root entity if the root entity already exists on the system (e.g. in the case of a system upgrade). At 110 a directed graph representing the dependency relationships between the entities in the system is built. The directed graph may for instance be built automatically from data stored on a computer readable medium, data received over a network, data entered by a user, or built manually by a user or a combination of the above. FIG. 4A shows an example of a directed graph which may be built in step 110. Entities are represented as nodes and dependency relationships represented by directed edges linking the nodes. A first entity 1 is a root entity. Second entity 2, third entity 3 and fourth entity 4 are dependent entities which are directly dependent on the first entity 1. Fifth entity 5 and sixth entity 6 are directly dependent on second entity 2. Eighth entity 8 is directly dependent on fourth entity 4. Seventh entity 7 is directly dependent on both the third entity 3 and the sixth entity 6.

At step 120 the directed graph is divided into levels. Each entity thus belongs to a specific level of the directed graph. In the example of FIG. 4A the directed graph is dived into three levels indicated by horizontal dashed lines. The levels are defined such that no entity in a given level is dependent on an entity of a lower level. Thus any changes to versions of entities in lower levels should not impact the operation of entities in upper levels. Referring to FIG. 4A, the first entity 1 is in the first level and entities 2, 3 and 4 (which are directly dependent on the first entity) are in the second level of the directed graph. Entities 5, 6, 7 and 8 are in the third level of the directed graph. Where an entity is directly dependent on several parent entities in different levels, it is placed into the level of its lowest parent or a level below that. Thus entity 7, which has parent entities in the second and third levels, is placed in the third level of the directed graph. Dividing entities into multiple levels makes it easier to assign versions to entities in such a way that parent entities are assigned versions before their dependent entities.

Figure 3B:
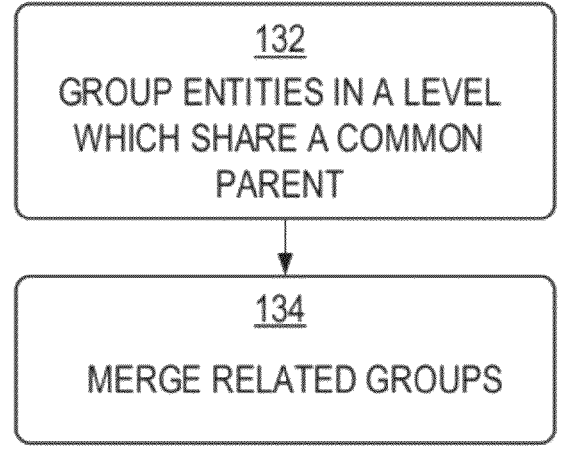
FIG. 3B is a flow diagram of an example method for forming isolated subsets of entities.

At 130 the entities other than the root entity are grouped into isolated subsets. An isolated subset is a subset in which none of the entities are dependent on an entity in another subset of the same level. There are various ways of doing this and one example is shown in FIG. 3B. At step 132 of FIG. 3B entities which share the same parent entity (i.e. depend directly from the same entity) are grouped together. At 134 some of these groups are merged together if they share an entity in common or if an entity in one group is dependent on an entity in another group. In the example of FIG. 4A, dependent entities 2, 3 and 4 are grouped together to form a first group 101, because they share the same parent entity (entity 1). This first group 101 is an isolated subset as none of its entities are dependent from an entity belonging to another group in the same level and nor do any of its entities belong to another group. Entities 5 and 6 share a common parent and therefore are grouped together into group 102 at step 132. Entities 7 and 8 do not share a common parent with other entities and therefore they are initially placed in their own separate 'groups' (103 and 104 respectively). However, at step 134 it is noted that entity 7 of group 103 is dependent on entity 6 of group 102, so groups 102 and 103 are merged to form an isolated subset 201 (as shown in FIG. 4B). Put more generally at step 134, a check is made to see if any of the groups resulting from step 132 are related, e.g. if there is an entity which belongs to more than one group in the same level or if there exists a dependency relationship between an entity of a first group and another entity in a second group. If so, then the related groups are merged.

At 140 of FIG. 3A compatible versions are determined for each entity within an isolated subset in upper levels of the directed graph before determining compatible versions for entities belonging to isolated subsets in lower levels of the directed graph. E.g. versions are determined for all entities in isolated subsets in the second level before determining versions for entities in isolated subsets in the third level. Within a given level the isolated subsets may be processed in any order or in parallel. This structured and logical approach helps to reduce the number of iterations and reduce or minimize repeated looping in the process of determining compatible versions.

Within an isolated subset a compatible version for each entity is determined in turn, starting with entities which are not dependent on any other entities inside the subset and next assigning versions to entities which are dependent on already assigned entities. A compatible version for each entity can be found by referring to the compatibility relationships of that entity with its parent entities and the versions already assigned to the parent entities.

At 150, information relating to the determined versions is the desired output. In one example, the output may be a list of all the entities and their versions; in another example, it may be information relating to the entities which are to be changed and their new versions. The output may be used to plan fresh installation of, or an upgrade of, the entities in the computer system. The installation or upgrade may be scheduled for implementation at a later time or may be implemented directly.

Figure 3C:
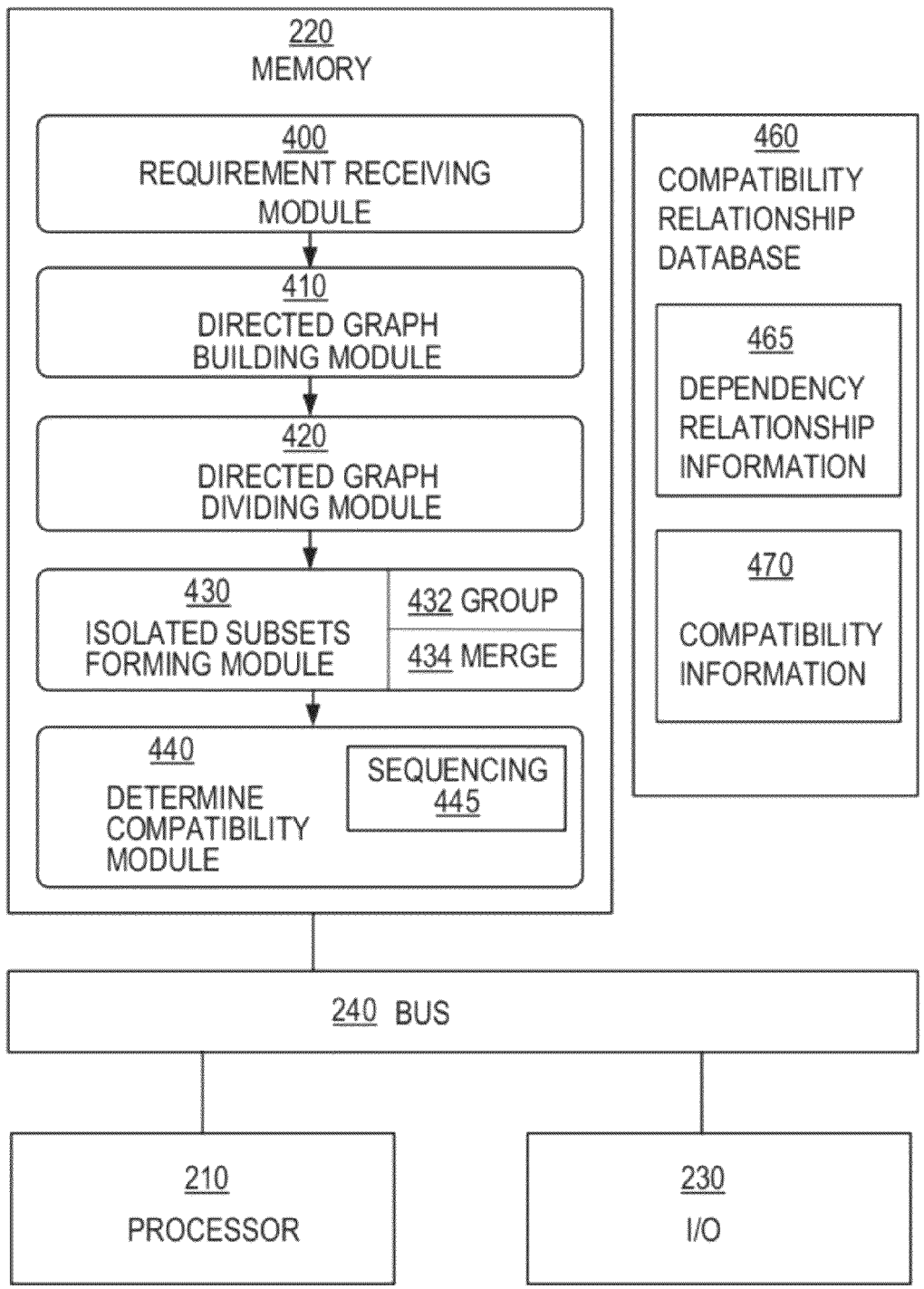
FIG. 3C shows an example of an apparatus for carrying out the method of FIGS. 3A and 3B.

FIG. 3C shows one example of an apparatus on which the method of FIGS. 3A and 3B may be implemented. The apparatus may form part of the computer system for which compatible entities are being determined, or it may be a separate apparatus which does not form part of the system for which compatible entities are being determined The apparatus 200 comprises a microprocessor, control logic, or micro controller 210 for executing machine readable instructions stored in a memory 220. The machine readable or computer executable instructions may, when executed by the processor 210, perform method steps as described in FIG. 3A and 3B as a computer implemented method. Input and output operations may be handled by an I/O module 230. The processor 210, memory 220, and I/O interface 230 are coupled or are in communication via a bus 240.

The machine readable instructions comprise a plurality of modules which may be stored in memory 220.

There is a requirement receiving module 400 that receives a requirement specifying the version of the root entity. This may be a specified version to be installed in the case of a new install or change of version if the computer system is being upgraded or otherwise changed (e.g. a requirement that the root entity be changed to a specified version). A directed graph building module 410 builds a directed graph of the dependency relationships as described at 110 of FIG. 3A. A directed graph dividing module 420 divides the directed graph into levels. An isolated subset forming module 430 groups together entities of the same level into isolated subsets. The isolated subset forming module may have a grouping sub-module 432 which groups together entities which are directly depended on the same parent entity and a merging module 434 that merges related groups as described above. A compatibility module 440 determines compatible versions for each entity. It determines the compatible versions for entities in upper levels of the directed graph before determining compatible versions for entities in lower levels of the directed graph. The compatibility module may have a subset sequencing sub-module 445 which orders the subsets into a sequence starting with isolated subsets in upper levels of the directed graph and proceeding downwards; isolated subsets within a level may be placed in any order relative to each other. The compatibility module then determines compatible versions for entities in each isolated subset in turn moving down the sequence. In other implementations, isolated subsets within a level may be processed in parallel.

The apparatus may access a compatibility relationship database 460 which comprises dependency relationship information 465 giving the dependency relationships between entities in the computer system and version compatibility information 470 indicating which versions of entities are compatible with which versions of other entities. The database may be provided in a memory of the apparatus (e.g. a RAM or hard disk etc) or may be accessible over a network, for instance. Information on the compatibility database 460 may for example be referred to when building the directed graph of dependency relationships and/or when determining the compatible versions for each entity. The apparatus of FIG. 3C may be implemented on dedicated hardware, as a set of machine readable instructions for execution by a processor, or a combination thereof.

By way of example, a more complex system of entities will now be described with reference to the directed graph shown in FIG. 6. First entity 1 is the root entity and it is assigned a specified version. Entities 2 to 19 are directly or indirectly dependent on root entity 1.

Figure 5:
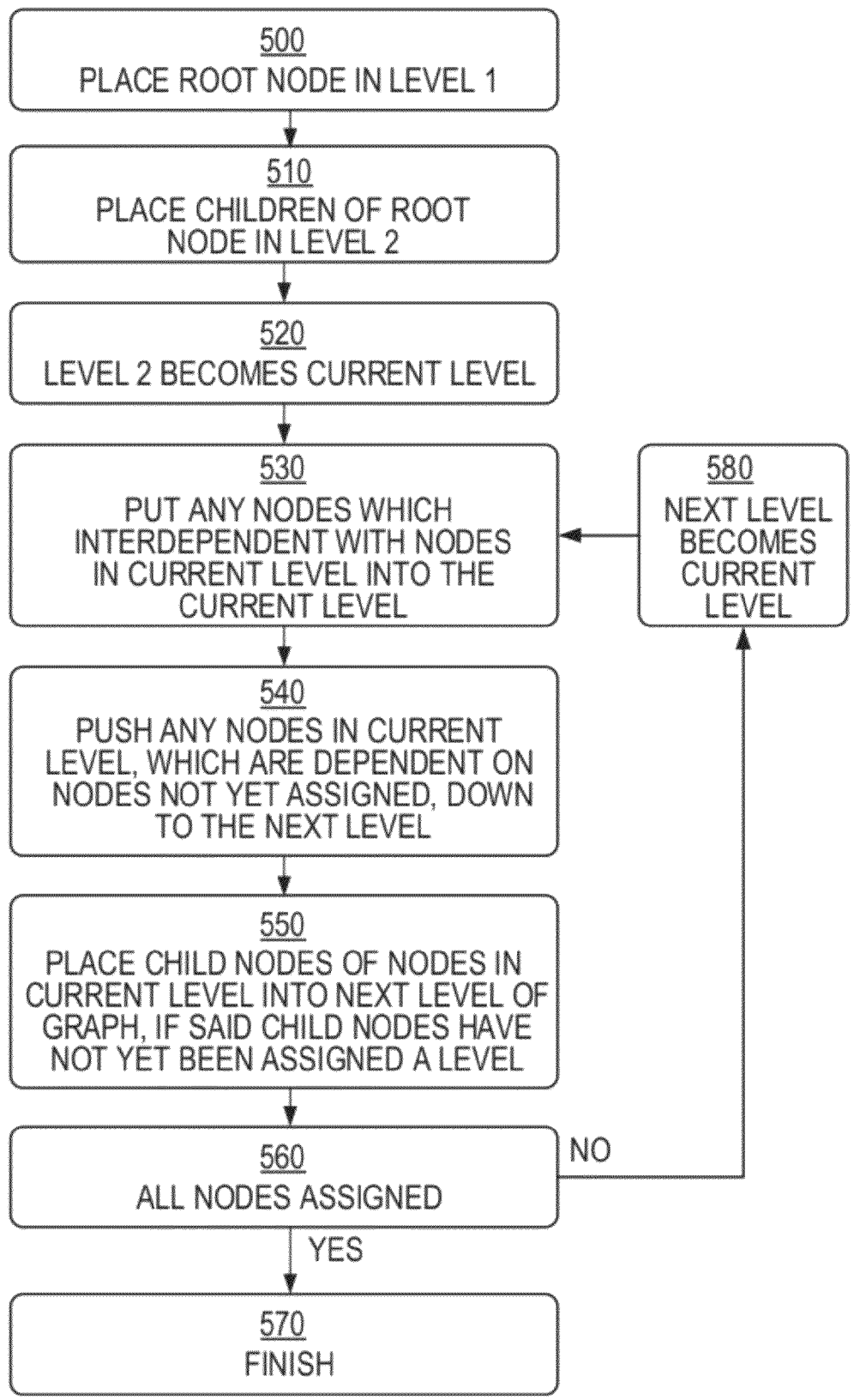
FIG. 5 is a flow diagram of an example method of dividing a directed graph into levels.

The directed graph is divided into levels using a parent-child node principle with each entity being treated as a node in the directed graph. The entities are assigned to levels in such a way that no entity is dependent on an entity in a lower level of the directed graph. However, entities may be dependent on entities in the same level of the directed graph. As the system is rather complicated, a structured method of dividing the directed graph into levels may be used. An example is shown in FIG. 5.

At 500 the first entity (the "root entity") is represented in the first level of the directed graph as the root node. At 510, children of the root node are assigned to level two of the directed graph. At 520, level 2 becomes the 'current level' of the directed graph. At 530, nodes which are interdependent with nodes already in the current level are placed into the current level of the graph. At 540, nodes which are in the current level of the graph, but which are one-way dependent (i.e. no mutual dependency) on nodes which have not yet been assigned to a level, are pushed down to the next level of the graph. At 550, child nodes of nodes in the current level of the directed graph are placed in the next level of the directed graph if the child node has not already been assigned to the current level. At 560, a check is made to see if all the nodes in the system have been assigned to a level. If yes, then the level dividing process finishes at 570. If all of the nodes have not yet been assigned to a level then the method moves down one level of the graph at 580 (i.e. the next level becomes the current level) and then back to 530. Steps 530 to 560 are repeated until all nodes have been assigned levels.

In the above example, nodes which are dependent on nodes of the same level are allowed to stay in that level, however in other possible methods of dividing the graph into levels, nodes which are dependent on, but not interdependent with, a node of the same level may be pushed down to the next level of the graph.

Figure 6:
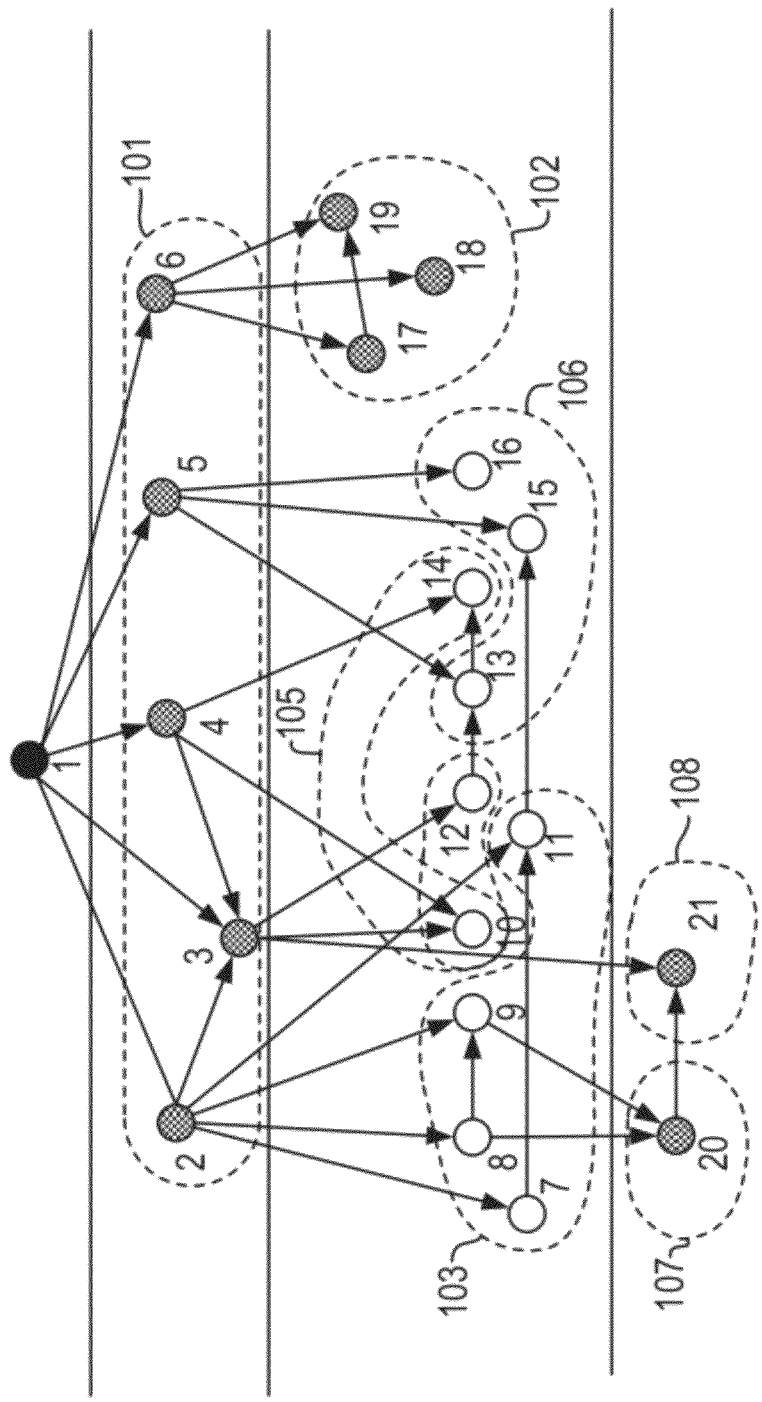
FIG. 6 shows an example of a directed graph representing twenty one entities and their dependency relationships and dividing of the entities into groups within each level.

For the directed graph shown in FIG. 6, entity 1 is the root entity and so placed in the first level. Entities 2, 3, 4, 5 and 6 are dependent on the root entity 1 and so are placed in the level below the root node: i.e. the second level. Entity 3 is directly dependent on entities 2 and 4, which are also in the second level, but as it is not dependent on an entity which have not yet been assigned a level, so it is allowed to stay in the second level.

Entities 7-9 are children of entity 2 of the second level and so are placed in the third level. It is noted that entities 8 and 9 are interdependent and therefore should be placed in the same level. Entities 17, 18 and 19 are children of entity 6 in the second level and so are placed in the third level. While, entity 19 has a parent in the third level as well, it does not have any parents which are not yet assigned and so is allowed to stay in the third level.

Entities 10 and 16 have parents only in the second level and so are placed in the third level. Entity 11 has a parent (2) in the second level and a parent (7) in the third level and so is placed in the third level. Similarly entity 15 is directly dependent on entities in the second and third levels and so is placed in the third level.

Entities 12, 13 and 14 have parents in the second level. They are also in a cyclic dependency relationship (i.e. are indirectly interdependent) and there is no additional parent on which any of them is dependent; hence they are all placed in the same level (the third level). Entity 20 has parent entities 8 and 9 in the third level and so is placed in the fourth level. Entity 21 has a parent 3 in the second level and so it is initially placed in the third level, but then is moved to the fourth level when it is discovered that it has a parent 20 in the fourth level. The directed graph dividing module 120 of FIG. 3C may be arranged to carry out the above described process, e.g. according to the flowchart of FIG. 5 or another process which divides the directed graph into levels such that no entity is dependent on an entity in a lower level.

The entities are now grouped into isolated subsets as described at 130-136 of FIGS. 3A and 3B. Entities which are directly dependent from the same parent node and are in the same level of the directed graph are grouped together. For example, in FIG. 6, entities 2, 3, 4, 5 and 6 are grouped together as an isolated subset (indicated as isolated subset 101) as all of them are directly dependent on entity 1. After this there are no entities left in level 2, so next isolated subsets are formed in level 3. Entities 7, 8, 9 and 11 form a group 103 as they are directly dependent on entity 2. Entities 10, 12 and 21 are directly dependent from entity 3; of these, entities 10 and 12 form a group 104; however, entity 21 does not form part of this group because while it is directly dependent from entity 3, it is not in the same level of the directed graph as entities 10 and 12. Entities 10 and 14 form group 105 which comprises entities which are in the second level of the directed graph and have entity 4 as a parent. Entities 13, 15 and 16 form another group 106 and entities 17, 18 and 19 form group 102.

Figure 7:
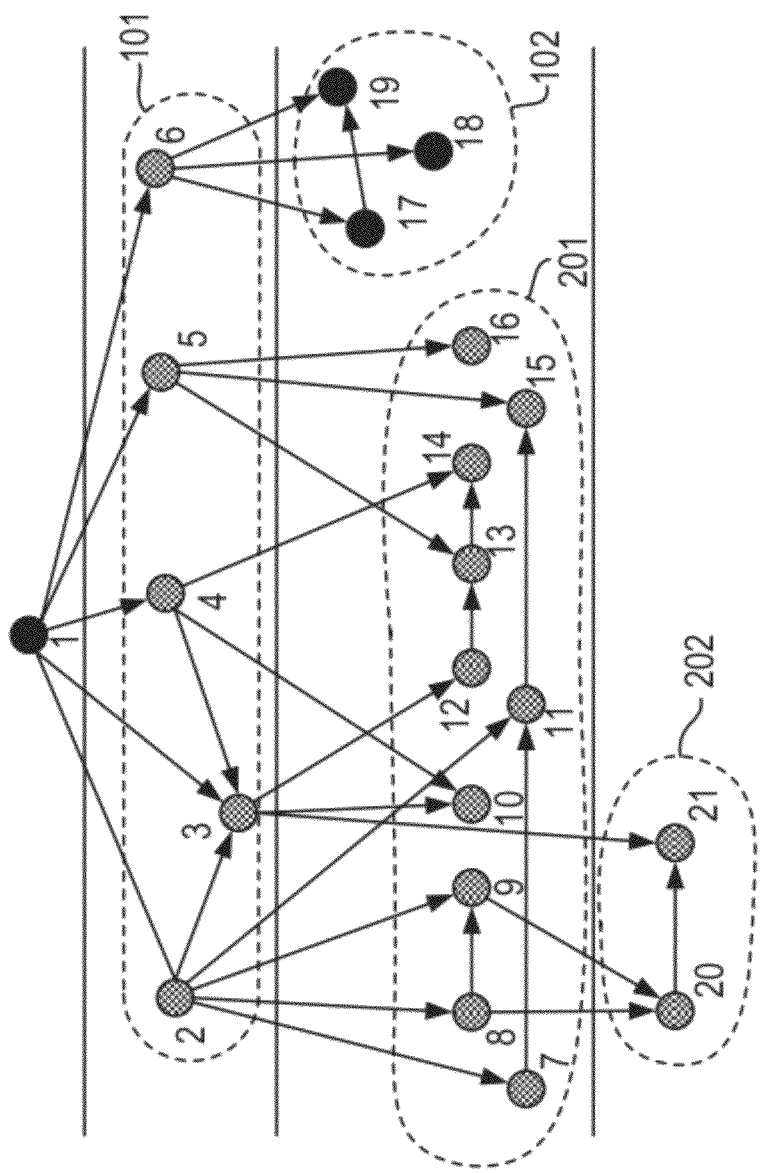
FIG. 7 shows the example of FIG. 6 after some of the groups have been merged.

Certain groups may be merged as described in 134 of FIG. 3B. In general any groups containing a common entity are merged and any two groups which are of the same level and have a direct dependency between one entity from each are merged. The merging is shown in FIG. 7. As entity 10 is part of both groups 104 and 105 in the third level of the directed graph, groups 104 and 105 are merged. As entity 15 of group 106 is dependent on entity 11 of group 103, and groups 106 and 103 are in the same level, groups 106 and 103 are merged. Similarly since entity 14 of group 105 is dependent on entity 13 of group 106, groups 105 and 106 are merged. So finally groups 103, 104, 105 and 106 are merged to form an isolated subset 201 as shown in FIG. 7. The entities of group 102 do not depend on any entities of other subsets of the same level and neither do they belong to any other subset of the same level, so group 102 is not merged and stands alone as its own isolated subset. In the next level of the directed graph, i.e. level four, initially two groups 107 and 108 are formed. Group 107 contains entity 20 and group 108 contains entity 21—as these entities have different parents they are initially in different groups. However entity 21 is dependent on entity 20, so the groups 107 and 108 are merged to form isolated subset 202.

The end result is shown in FIG. 7. Entities 2, 3, 4, 5 and 6 are in a first isolated subset 101. Entities 17, 18 and 19 are in a second isolated subset 102. Entities 7, 8, 9, 10, 11, 12, 13, 14, 15 and 16 are in a third isolated subset 201. Entities 20 and 21 are in fourth isolated subset 202.

Next the isolated subsets are ordered into a sequence. The isolated subsets are placed in order such that the isolated subsets of the upper levels are kept before the isolated subsets of the lower levels. So, for example, isolated subsets in level 2 are placed earlier in the sequence than isolated subsets in level 3. Within a level the isolated subsets may be placed in any order. Therefore isolated subset 101 is placed first in the sequence. Either isolated subset 201 or isolated subset 102 may be placed second and the other isolated subset is placed third. The next level's isolated subset 202 is placed last. In one example, the sequence may have isolated subsets in the order 101, 201, 102 and 202.

Next compatible versions are determined for the entities in each isolated subset in turn in the order of isolated subsets specified in the sequence. So compatible versions for all the entities in the isolated subset 101 are determined before determining compatible versions for entities in isolated subset 201. Alternatively compatible versions may be determined for entities in isolated subsets in parallel for each level of the directed graph in turn, starting with isolated subsets in the second level and moving downwards. Within each isolated subset, determining of compatible versions for the entities is carried out in stages, starting with entities which do not have parents within the isolated subset and performing next for the entities whose parents have already been assigned. In the first subset 101, at a first stage compatible versions are found for entities 2, 4, 5 and 6, as their parent entities (in this case entity 1 is the parent entity) have already been assigned final versions. Once this first stage is complete, all the parents of entity 3 have been assigned versions. Thus, in the second stage, entity 3 is assigned a compatible version based on the versions assigned to its parent entities 1, 2 and 4.

Compatible versions for each entity may be determined based on the version assigned to its parent entity (or parent entities) and compatibility relationships therewith. The compatibility relationship comprises both the direction of the dependency and information relating to which version or ranges of versions of the dependent entity are compatible with the parent entity. The compatibility relationships may, for example, be obtained from a memory, e.g. a chip memory or hard disk of the apparatus or an external memory such as a database accessible over a network for instance.

In some cases, a dependent entity may have only one parent, but a range of versions of the dependent entity may be compatible with the parent entity. Similarly, in some cases, an entity may have several parents and there may be a choice of versions which are compatible with both parents. E.g. a first parent is compatible with versions 1-3 of the dependent entity, while the second parent is compatible with versions 2-3 of the dependent entity—in this case either version 2 or version 3 may be chosen in order for the dependent entity to be compatible. In such cases any compatible version may be chosen; however one option is to choose the lowest version of the dependent entity which is compatible with all the parent entities. Choosing the lowest compatible version has the advantage that consequential upgrading of any other entities in the system is likely to be reduced. Another option is to choose the highest version which is compatible with all the parent entities. Still another option is to examine the compatible ranges of the entity with respect to each parent and select the highest of said ranges' lower limits which is also below the upper limits of all said ranges. These methods of determining compatible versions, where there is no direct or indirect interdependence between the entities, are referred to as 'simple redundancy resolution'. One detailed example of 'simple redundancy resolution' has already been described earlier in this specification with reference to FIG. 2.

For the second subset 201, there are four stages. In the first stage, compatible versions are determined for entities 7, 10 and 16 because these are dependent only on entities in the earlier subsets (whose versions have already been determined). In a second stage a compatible version is found for entity 11 based on its compatibility relationship with entities 2 and 7 on which it is dependent and based on the already assigned versions of those entities.

In a third stage a compatible version is determined for entity 15 based on its compatibility relationship with entities 11 and 5 and based on the already assigned versions of those entities. Again simple redundancy resolution is used to assign compatible versions to the entities.

In a fourth stage a compatible version is determined for entities 8 and 9 which are dependent on each other and on entity 2. As entities 8 and 9 are interdependent, a special technique called 'triangular resolution' is used to resolve their compatible versions. Triangular resolution will be described in more detail later. Also in the fourth stage, compatible versions are found for entities 12, 13 and 14 which have a cyclic dependency relationship. As they have a cyclic dependency relationship, a special 'cyclic resolution' method is used to resolve their compatible versions. Cyclic resolution will be described in more detail later.

Next the compatible versions for entities in third subset 102 are determined. In first stage, compatible versions are determined for entities 17 and 18 which are dependent only on entity 6 of the first subset. In a second stage a compatible version for entity 19 is determined based on its compatibility relationship with entities 6 and 17 and based on the already assigned versions of those entities.

Finally compatible versions for entities of subset 202 are determined. In a first stage, a compatible version for entity 20 is determined based on the versions which have been assigned to entities 8 and 9 and its compatibility relationship with those entities. Then a compatible version is determined for entity 21 based on its compatibility relationships with and the versions already assigned to its parent entities 3 and 20.

Figure 8:
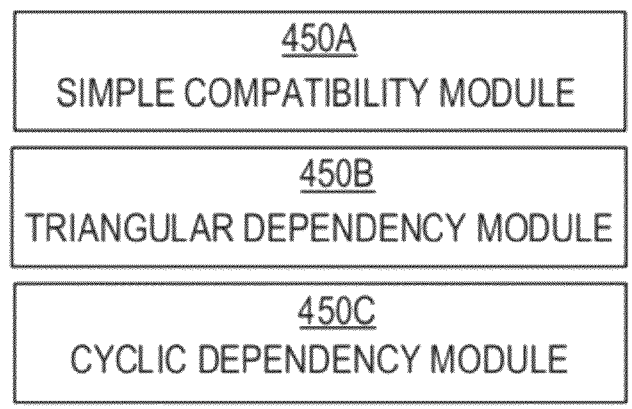
FIG. 8 shows an example of possible sub-modules for the apparatus of FIG. 3C.

Three methods of determining compatible versions of dependent entities were mentioned above. In a simple case there is no interdependent relationship and the compatible version for the dependent entity may be determined directly from its relationship with its parent entities and the compatibility range with its parent entities. This is called simple redundancy resolution. In other cases, the dependent entity may be interdependent with another entity, in which case either triangular resolution or cyclic resolution may be used to find a compatible version. The compatibility determining module 450 of FIG. 4A may have a sub-module for each type of version resolution as shown in FIG. 8. In the example of FIG. 8, there is a simple compatibility module 450A for determining compatibility versions for entities which are not in an interdependent relationship as described above, a triangular dependency module 450B for determining compatibility for entities which have a triangular dependency relationship and a cyclic dependency module 450C for determining compatibility for entities which have a cyclic dependency. These modules may be implemented as machine executable instructions in a machine readable memory. Methods used by modules 450B and 450C, for determining compatible versions where there is triangular dependency or cyclic dependency relationships, will now be described.

A triangular dependency relationship occurs when two dependent entities of the same parent entity are dependent on each other. An example is shown in FIG. 1D. The second and third entities $E_2$ and $E_3$ are interdependent on each other and also directly dependent on the first entity $E_1$.

Figure 9:
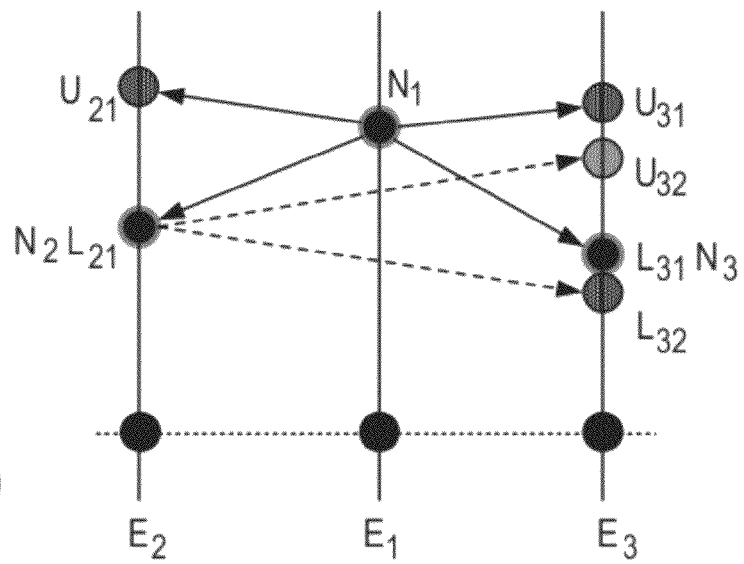
FIG. 9 shows an example of the compatibility relationships between three entities in a triangular dependency relationship.

FIG. 9 is a schematic diagram of the compatibility relationships of the three entities $E_1$, $E_2$ and $E_3$ which have a triangular dependency relationship. The bottom line shows the initial configuration in which each entity has its initial version. The first entity $E_1$ is the parent entity. The parent entity $E_1$ is changed (e.g. upgraded) to a specified version $N_1$ as shown in the diagram. New versions $N_2$ and $N_3$ of the second and third entities which are compatible with $N_1$ then need to be found.

The solid arrows in FIG. 9 shows the compatibility ranges of the second and third entities with respect to the specified version $N_1$ of the first entity. $L_{21}$ is the lower limit and $U_{21}$ is the upper limit of the compatibility range of $E_2$ with respect to $N_1$. Meanwhile $U_{31}$ is the upper limit and $L_{31}$ is the lower limit of the compatibility range of $E_3$ with respect to $N_1$.

In general, the notation $L_{xy}$ means the lowest version of entity $E_x$ which is compatible with the new version $N_y$ of entity $E_y$. The notation $U_{xy}$ means the highest version of entity $E_x$ which is compatible with the new version $N_y$ of entity $E_y$. Four different examples are described in detail below.

In the example shown in FIG. 9, a compatible version $N_2$ for the second entity is determined first. The compatible version $N_2$ of the second entity is set as the lower limit $L_{21}$ of its compatibility range with respect to $N_1$. Next a compatible version of the third entity is determined based on the already assigned versions $N_1$ and $N_2$ and the compatibility ranges of the third entity with respect to $N_1$ and $N_2$. The "compatibility range" of one entity with respect to another entity is the range of versions of the first entity which are compatible with a (specified version of) the second entity. The compatibility range of the third entity with respect to $N_2$ is shown by dashed arrows in FIG. 9—it has an upper limit of $U_{32}$ and a lower limit of $L_{32}$. The compatibility range of the third entity with respect to the $N_1$ is also shown and has an upper limit of $U_{31}$ and a lower limit of $L_{31}$. In the example of FIG. 9 these compatibility ranges can overlap. So if the third entity is assigned a version within the region of overlap then all the entities will be compatible. In this example, the new version $N_3$ of the third entity is set as the higher of the lower limits of the two overlapping compatibility ranges, i.e. it is set as $L_{31}$. Thus, at the end of the updating process, the first entity has the specified version $N_1$, the new version of the second entity is $L_{21}$ and the new version of the third entity is $L_{31}$. These versions are compatible with each other.

Figure 10:
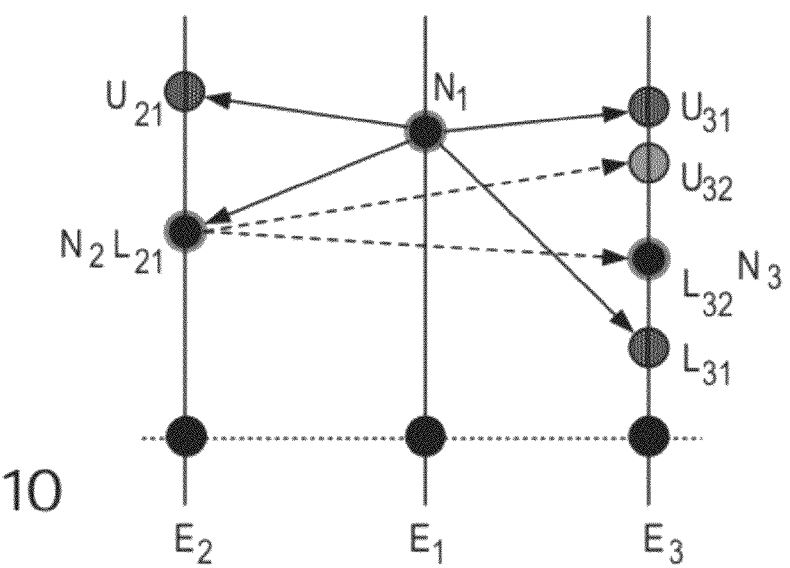
FIG. 10 shows another example of the compatibility relationships between three entities in a triangular dependency relationship.
Figure 11:
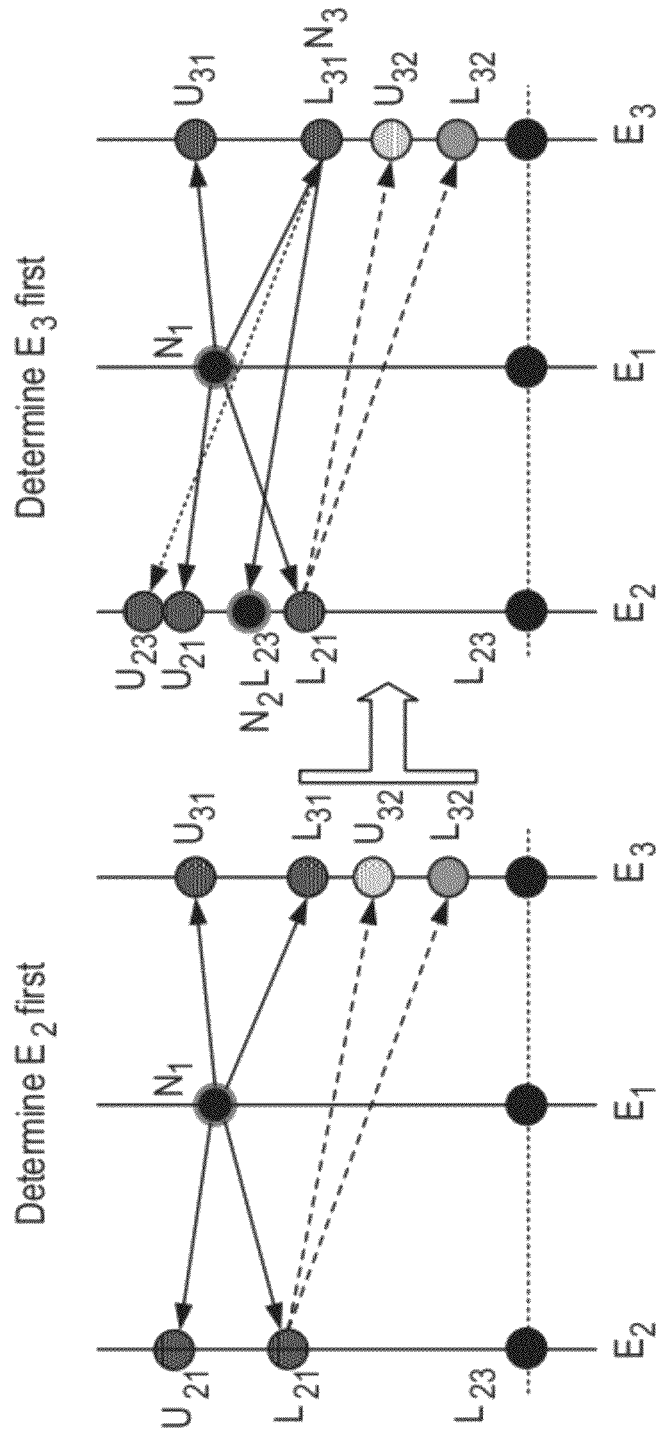
FIG. 11A shows another example of the compatibility relationships between three entities in a triangular dependency relationship and an attempt to determine a compatible version for the second entity before determining a compatible version for the third entity.
FIG. 11B shows compatibility relationships for the entities of FIG. 11A and an attempt to determine a compatible version for the third entity before determining a compatible version for the second entity.

FIG. 10 depicts another example. Again the compatibility ranges of $E_3$ with respect to $N_1$ and $N_2$ overlap. In this example $L_{32}$ (the lower limit of the compatibility range of $E_3$ with respect to $N_2$) lies within the compatible range of $E_3$ with respect to $N_1$ ($L_{31}$ to $U_{31}$). Therefore $L_{32}$ is chosen as the new version of $E_3$ In FIGS. 9 and 10, a compatible version for the second entity was found first and then a compatible version for the third entity was determined based on the already assigned versions of the first entity and the second entity. FIG. 11A and 11B show a situation in which compatibility cannot be resolved by assigning the second entity first and so the order is swapped and a compatible version for the third entity is found first.

FIGS. 11A and 11B use the same reference numerals and notation as FIGS. 9 and 10. In FIG. 11A, the new version $N_2$ of the second entity is determined and set at $L_{21}$. However the result is that there is no overlap between the compatibility ranges of the third entity $E_3$ with respect to $N_1$ and $N_2$. Specifically, $U_{32}$, the upper limit of the compatibility range of $E_3$ with respect to $N_2$ is below the lower limit $L_{31}$ of the compatibility range of $E_3$ with respect to $N_1$. So no version of the third entity can be found which is compatible with both $N_1$ and $N_2$.

Therefore in FIG. 11B, the order of determining compatibility is swapped around. A compatible version is determined first for the third entity $E_3$ and later for the second entity $E_2$. Thus the new version of the third entity $N_3$ is set as $L_{31}$ (the lower limit of its compatibility range with respect to the first entity). The compatibility ranges of the second entity with respect to the first and third entity overlap as shown on the left side of FIG. 11B. $L_{23}$, the lower compatibility limit of the second entity with respect to the third entity lies in the compatible range of the second entity with respect to the first entity. i.e. $L_{23}$ lies between $L_{21}$ and $U_{21}$ Therefore $L_{23}$, the highest of the lower limits of the overlapping ranges, is chosen as the version to be assigned to $N_2$. Compatibility between $E_1$, $E_2$ and $E_3$ is thus established.

Figure 12:
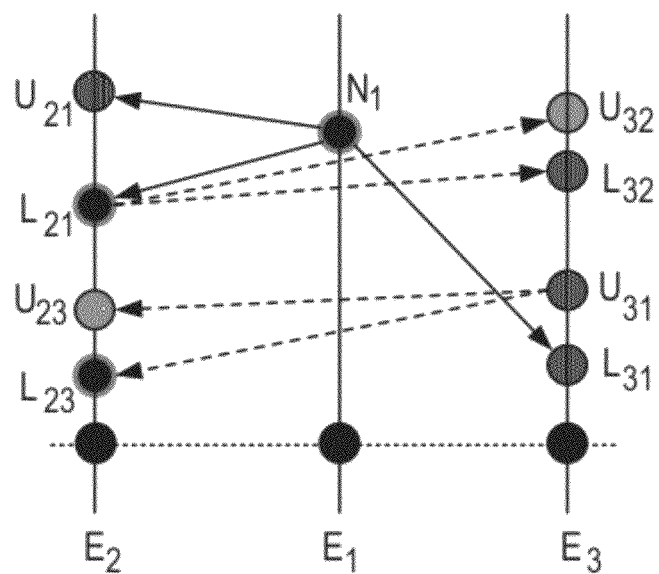
FIG. 12 shows an example in which compatible versions cannot be found for all of the entities in a triangular dependency relationship.

Even with this triangular resolution method, it is not always possible to find compatible versions of all the entities. In the scenario shown in FIG. 12, the compatibility ranges of the second entity with respect to the first and third entities do not overlap ($L_{21}$ is above $U_{23}$). Also the compatibility ranges of the third entity with respect to the first and second entities do not overlap either ($L_{32}$ is higher than $U_{31}$). Therefore, no compatible versions can be found for entities $E_1$, $E_2$ and $E_3$.

Figure 13:
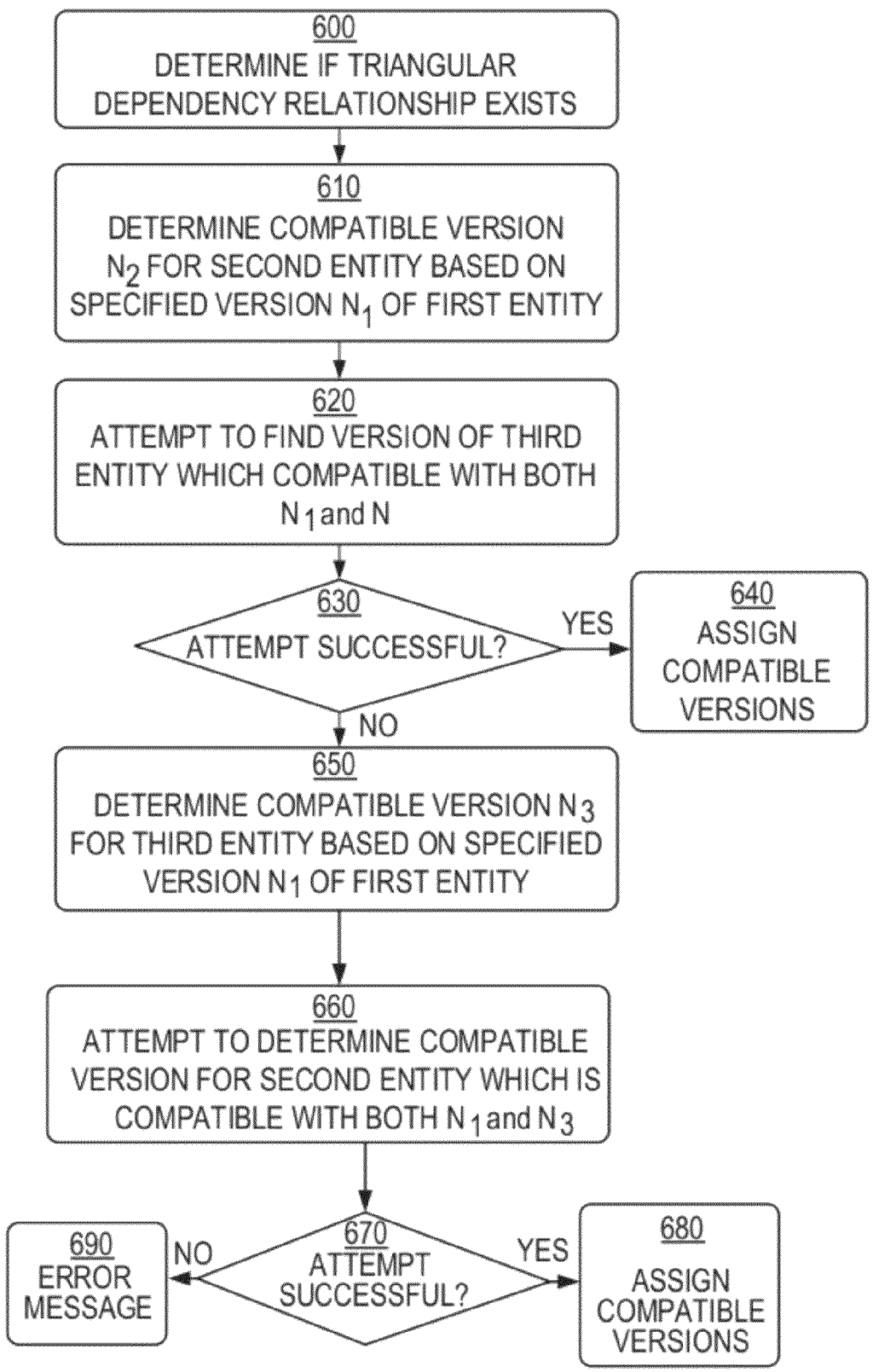
FIG. 13 is a flow diagram of an example method for determining compatible versions for dependent entities using triangular resolution.

FIG. 13 is a flow diagram for an example method for determining compatible versions for dependent entities using triangular resolution. At 600, it is determined that a triangular dependency relationship exists. At 610 a compatible version for the second entity is determined based on the specified version of the first entity and based on the compatibility relationship between the first entity and the second entity. In this example, where there is a range of possible compatible versions for the second entity, the lower limit of the compatibility range is chosen. Then at 620, an attempt is made to find a version for the third entity which is compatible with both the specified version of the first entity and the recently determined compatible version of the second entity.

As shown at 630 and 640, if a compatible version for the third entity is successfully found then the entities are assigned the compatible versions that have been determined at 610 and 620. If no compatible version for the third entity could be found at 620, then at 650, a compatible version for the third entity is determined based on the specified version of the first entity and the compatibility relationship of the third entity with respect to the first entity. If there is a range of possible compatible versions for the third entity, then the lowest limit of the compatibility range is chosen. At 660, a compatible version for the second entity is determined based on the specified version of the first entity, the compatible version of the third entity which has just been determined and the compatibility relationships between the second entity and the first and third entities. If a compatible version is found, then the second and third entities are assigned the versions determined at 670 and 680. If no compatible version could be found, then an error message is generated (690). The method shown in FIG. 13 may be implemented as a set of machine executable instructions in the sub-module 450B of FIG. 8.

A method of determining compatible versions of entities in a cyclic dependency relationship will now be described. FIG. 1C shows an example of a plurality of entities in a cyclic dependency relationship. A cyclic dependency relationship is a configuration in which a parent entity is indirectly dependent on its dependent entity. For example, in FIG. 1C the second entity depends on the first entity which is its parent entity; however the first entity indirectly depends on the second entity via its dependency relationship with the third entity.

Figure 14:
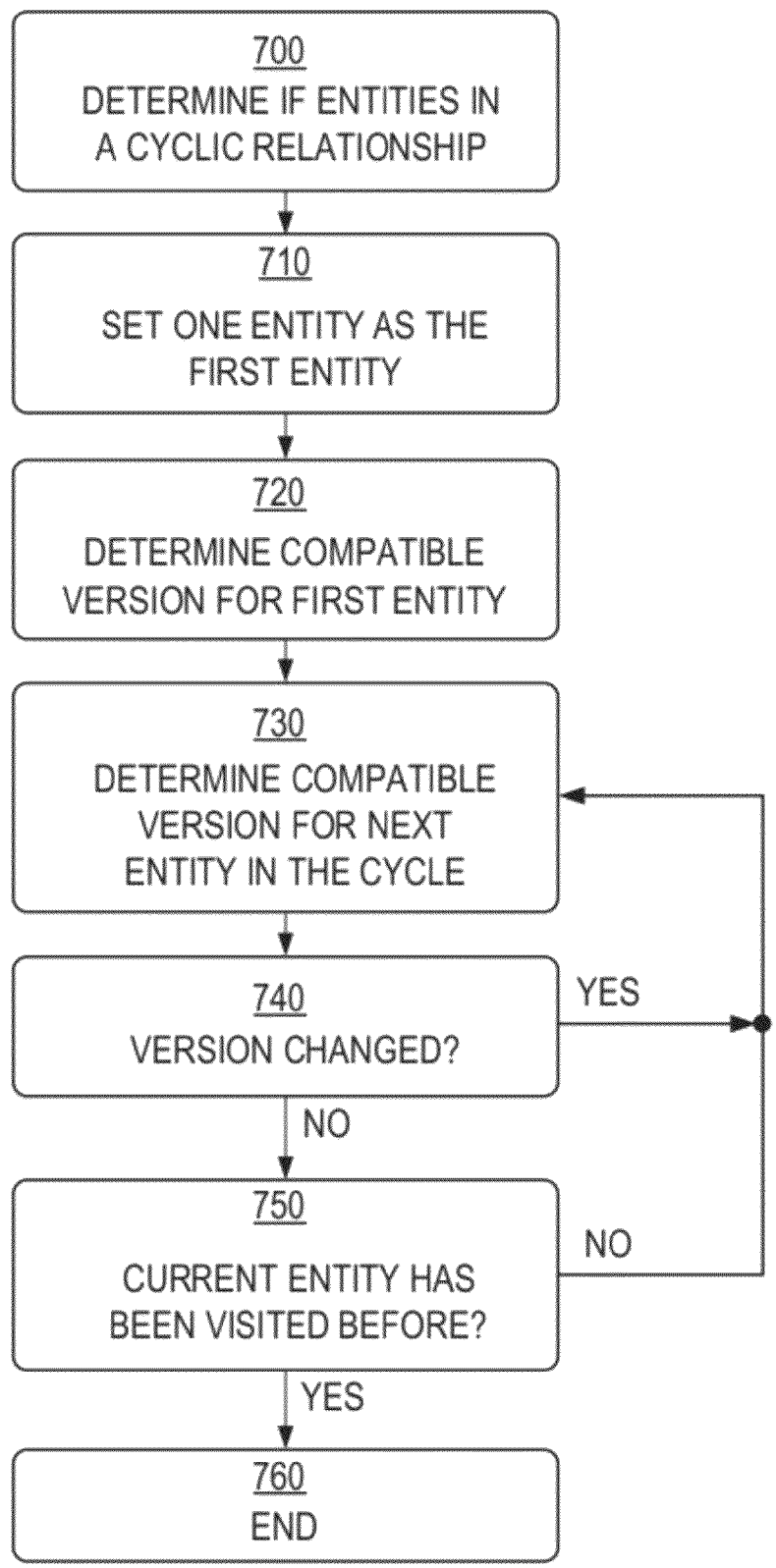
FIG. 14 is a flow diagram of an example method for determining compatible versions for entities in a cyclic dependency relationship.

FIG. 14 is a flow diagram for an example method of determining compatible versions of entities in a cyclic dependency relationship. At 700, it is detected that the entities are in a cyclic dependency relationship. For example, this can be detected by navigating the entities of the logical tree one after another along the dependency relationship lines. If at the end, there is no further dependency then it is not a cyclic dependency relationship (e.g. if this process is applied to the arrangement shown in FIG. 1A it will stop at the third entity $E_3$), however if this leads back to the first entity (as it will if applied to the arrangement shown in FIG. 1C) then there is a cyclic dependency relationship.

At 710 one of the entities in the group is set as the first entity of the cycle. The first entity in the cycle should be an entity whose parents have all already been assigned versions, except for the parent in the cycle itself. At 720, a compatible version for the first entity is determined based on the versions already assigned to its parent entities, excluding those parent entities which are part of the dependency cycle (or based on its specified version if the first entity in the cycle is also the 'root entity' of the system). For example in FIG. 7, entity 12 can be set as the first entity in the cycle and an initial compatible version for entity 12 can be determined on the basis of the version already assigned to its parent entity 3. At 730 a compatible version for the next entity in the cycle is then determined based on all its parent entities (e.g. in FIG. 7 a compatible version for entity 13 may be found based on its compatibility relationship with entities 5 and 12). At 740, a check is made to determine if the version of the entity was changed at 730. If it was changed then the process loops back to 730 and a compatible version is found for the next entity in the chain of dependencies. If on the other hand the entity version was not changed at 730, then the process proceeds to 750. At 750, a check is made to see if the current entity has been visited before in the process. If not then the process loops back to 730 and a compatible version is determined for the next entity in the dependency chain. If however at 750 it is found that the entity has been visited before and its version remains unchanged then a stable configuration has been reached and all the versions in the dependency loop are compatible. The process then ends (760). The method of FIG. 14 may be implemented as a set of machine readable instructions in the sub-module 450C of FIG. 8.

To further illustrate cyclic dependency resolution, take for example a cyclic dependency loop $E_1 \rightarrow E_{2y} \rightarrow E_{3z} \rightarrow E_{1v}$ (where $E_{ij}$ is version 'j' of entity $E_i$ and the arrows indicate the dependency relationship); then by going round the loop, a compatible version should be found for each entity in turn which is compatible with the preceding entity. This continues until $E_{1x}=E_{1v}$, i.e. until x=v such that the version of $E_1$ at the start and the end of the loop is the same. At this point a stable configuration has been reached and all the entities in the group have compatible versions. This may take an iteration around the loop or may take several iterations. An example with three iterations is given below. The version numbers for each entity after the iteration are given in brackets.

First iteration: $E_1(1.8) \rightarrow E_2(3.2) \rightarrow E_3(2.7) \rightarrow E_1(2.1)$
Second iteration: $E_1(2.1) \rightarrow E_2(3.3) \rightarrow E_3(2.8) \rightarrow E_1(2.2)$
Third iteration: $E_1(2.2) \rightarrow E_2(3.4) \rightarrow E_3(2.8) \rightarrow E_1(2.2)$ After the first iteration (updating each entity in the loop in turn until the first entity is reached again) $E_1$ is at version 2.1. This is higher than the version which $E_1$ had at the start of the first iteration. Therefore a further iteration is needed. After the second iteration, $E_1$ is at 2.2 which is higher than the version which it had at the start of the second iteration. After the third iteration $E_1$ is at version 2.2 which is at the same version as at the start of the third iteration. Therefore the configuration is stable and all of the entities are compatible with each other.

In a further example, a carrier carrying computer implementable instructions, is provided that, when interpreted by a computer, causes the computer to perform a method in accordance with any of the above-described examples.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless explicitly stated otherwise, each feature disclosed is one example only of a generic series of equivalent or similar features.

What is claimed:

1. A computer executed method of determining compatible versions of dependent entities of a root entity having a specified version in a computer system, the method comprising:
   building a directed graph comprising the dependent entities;
   dividing the directed graph into multiple levels;
   determining which level of the multiple levels each dependent entity belongs to;
   dividing each level into one or more isolated subsets; and
   determining compatible versions for all entities in upper levels of the directed graph before determining compatible versions for any entity in lower levels of the directed graph;
   wherein building the directed graph comprises:
   representing the entities by nodes and dependency relationships between the entities by edges; and
   putting a directed edge from a first node to a second node which is dependent on the first node and referring to the first node as a parent node and the second node as a child node;
   wherein the directed graph is divided into levels in such a way that no node of a given level is dependent on a node of a lower level; and
   wherein dividing the directed graph into multiple levels comprises:
   putting a root node representing the root entity in a first level of the directed graph and all of said root node's child nodes into a new level and then for each level of the directed graph:
   a. including in the current level all nodes which are interdependent directly or indirectly with the nodes already included in the current level;
   b. pushing into a next level of the directed graph all those nodes from the current level that are dependent on nodes which have not yet been assigned to a level; and
   c. putting all the child nodes of parent nodes in the current level into the next level of the directed graph if said child nodes have not already assigned to a level; and
   repeating a) to c) until all nodes have been assigned to a level of the directed graph.

2. The method of claim 1 wherein dividing each level into one or more isolated subsets comprises grouping together nodes which are in the same level and which share the same parent into the same isolated subset.

3. The method of claim 2 wherein dividing each level into one or more isolated subsets comprises forming groups of nodes of the same level which share the same parent and merging of two groups of the same level if there exists a common node between them or it a node from one of said two groups is dependent on a node of the other of said two groups.

4. The method of claim 1 wherein determining compatible versions comprises determining compatible versions of entities belonging in isolated subsets of the same level in sequence or in parallel.

5. The method claim 1, wherein determining compatible versions of entities in an isolated subset comprises assigning versions to entities whose patents have already been assigned based on simple redundancy resolution.

6. The method of claim 1, wherein determining compatible versions of entities in an isolated subset further comprises performing triangular dependency resolution if two entities are mutually dependent and share a common parent whose version has already been assigned.

7. The method of claim 1, wherein determining compatible versions of entities in an isolated subset further comprises performing cyclic dependency resolution for entities belonging to a plurality of entities which are dependent on each other in a cycle.

8. The method of claim 5 wherein simple dependency resolution comprises considering the upper and lower limits of the compatibility ranges of a dependent entity with respect to each of its parent entities and assigning to said dependent entity the highest version of said lower limits which is below said upper limits of said compatibility ranges.

9. The method acclaim 6 wherein a first entity is a common parent of second and third entities and said second and third entities are mutually dependent on each other; and wherein triangular dependency resolution of the second and third entities comprises;
 a. assigning to the second entity the lowest version which is compatible with the first entity;
 b. assigning to the third entity a version which is compatible with the already assigned version of the first entity and the version assigned to the second entity in step a), if there exists overlap in the compatibility ranges of the first and second entities with respect to the third entity;
 c. assigning entities in reverse of above mentioned order if there does not exist overlap in the compatibility ranges of the first and second entities with respect to the third entity; and
 d. indicating a result of no compatibility if the compatibility ranges do not overlap even after reversing the order.

10. The method of claim 9 wherein in step b) the third entity is assigned the highest of the lower limits of the overlapping compatibility ranges of the first and second entities with respect to the third entity.

11. The method of claim 7, wherein cyclic dependency resolution comprises:
 assigning a compatible version to an one entity in the cycle, all of whose parents except for a parent node that is part of the cycle, having already been assigned versions;
 assigning a version to the next entity in the cycle based on the recently assigned version of the parent entity in the cycle and any other parent entities outside the cycle, if they exist;
 continuing this process until an entity is not assigned or not reassigned a new version.

12. An apparatus comprising a processor, a memory in communication with the processor, and computer executable instructions stored in the memory and executable by the processor to:
 build a directed graph containing dependent entities;
 divide the directed graph into multiple levels and determine which level of the multiple levels each dependent entity belongs to;
 assign the dependent entities in each level into one or more isolated subsets;
 assign compatible versions for all entities in upper levels of the directed graph before assigning compatible versions for any entity in lower levels of the directed graph;
 wherein the instructions to build the directed graph comprise instructions to:
 represent the entities by nodes and dependency relationships between the entities by edges; and
 put a directed edge from a first node to a second node which is dependent on the first node and referring to the first node as a parent node and the second node as a child node;
 wherein the directed graph is divided into levels in such a way that no node of a given level is dependent on a node of a lower level; and
 wherein the instructions to divide the directed graph into multiple levels comprise instructions to put a root node representing the root entity into a first level of the directed graph and all of said root node's child nodes into a new level and then for each level of the directed graph:
 a. include in the current level all nodes which are interdependent directly or indirectly with the nodes already included in the current level;
 b. push into a next level of the directed graph all those nodes from the current level that are dependent on nodes which have not yet been assigned to a level; and
 c. put all the child nodes of parent nodes in the current level into the next level of the directed graph if said child nodes have not already assigned to a level; and
 repeat a) to c) until all nodes have been assigned to a level of the directed graph.

13. A method executed by a processor of upgrading a computer system comprising a root entity and a set of other entities that are dependent on the root entity, the method comprising:
 specifying a change to the root entity or receiving information relating to a specified change for the root entity;
 building a directed graph of the entities, dividing the directed graph into multiple levels and determining which level of the multiple levels each entity belongs to;
 grouping entities within a same level of the graph into one or more isolated subsets, each isolated subset comprising entities which are directly dependent on a common parent entity; and
 determining consequential changes to the entities in each isolated subset, consequential changes for the entities in isolated subsets in upper levels of the directed graph being determined before consequential changes for entities in isolated subsets in lower levels of the directed graph;
 wherein at least one level of the directed graph includes at least a first isolated subset and a second isolated subset, said second isolated subset including a plurality of entities;
 wherein building the directed graph comprises:
 representing the entities by nodes and dependency relationships between the entities by edges; and
 putting a directed edge from a first node to a second node which is dependent on the first node and referring to the first node as a parent node and the second node as a child node;
 wherein the directed graph is divided into levels in such a way that no node of a given level is dependent on a node of a lower level; and
 wherein each entity corresponds to a node in the directed graph and wherein dividing the directed graph into multiple levels comprises:
 putting a root node representing the root entity in a first level of the directed graph and all of said root node's child nodes into a new level and then for each level of the directed graph:
 a. including in the current level all nodes which are interdependent directly or indirectly with the nodes already included in the current level;
 b. pushing into a next level of the directed graph all those nodes from the current level that are dependent on nodes which have not yet been assigned to a level; and
 c. putting all the child nodes of parent nodes in the current level into the next level of the directed graph if said child nodes have not already assigned to a level; and
 repeating a) to c) until all nodes have been assigned to a level of the directed graph.

14. The method of claim 13 further comprising implementing the consequential changes or scheduling the consequential changes to be implemented in an upgrade.

15. The method of claim 13 wherein within each level of the directed graph isolated subsets are ordered into a sequence and wherein consequential changes are determined for the entities in each isolated subset in turn in the order of isolated subsets specified in the sequence.

* * * * *

UNITED STATES PATENT AND TRADEMARK OFFICE
CERTIFICATE OF CORRECTION

PATENT NO.          : 8,997,084 B2          Page 1 of 1
APPLICATION NO.     : 13/090270
DATED               : March 31, 2015
INVENTOR(S)         : Raj Narayan Marndi et al.

It is certified that error appears in the above-identified patent and that said Letters Patent is hereby corrected as shown below:

In the Claims

In column 14, line 40, in Claim 3, delete "it" and insert -- if --, therefor.

In column 14, line 44, in Claim 4, delete "in" and insert -- to --, therefor.

In column 14, line 46, in Claim 5, delete "method claim" and insert -- method of claim --, therefor.

In column 14, line 48, in Claim 5, delete "patents" and insert -- parents --, therefor.

In column 14, line 66, in Claim 9, delete "method acclaim" and insert -- method of claim --, therefor.

In column 15, line 23, in Claim 11, delete "an" and insert -- any --, therefor.

Signed and Sealed this
Fourteenth Day of July, 2015

Michelle K. Lee
*Director of the United States Patent and Trademark Office*